H. HOLLERITH.
SORTING MACHINE.
APPLICATION FILED AUG. 9, 1912.
1,237,646.
Patented Aug. 21, 1917.
9 SHEETS—SHEET 6.
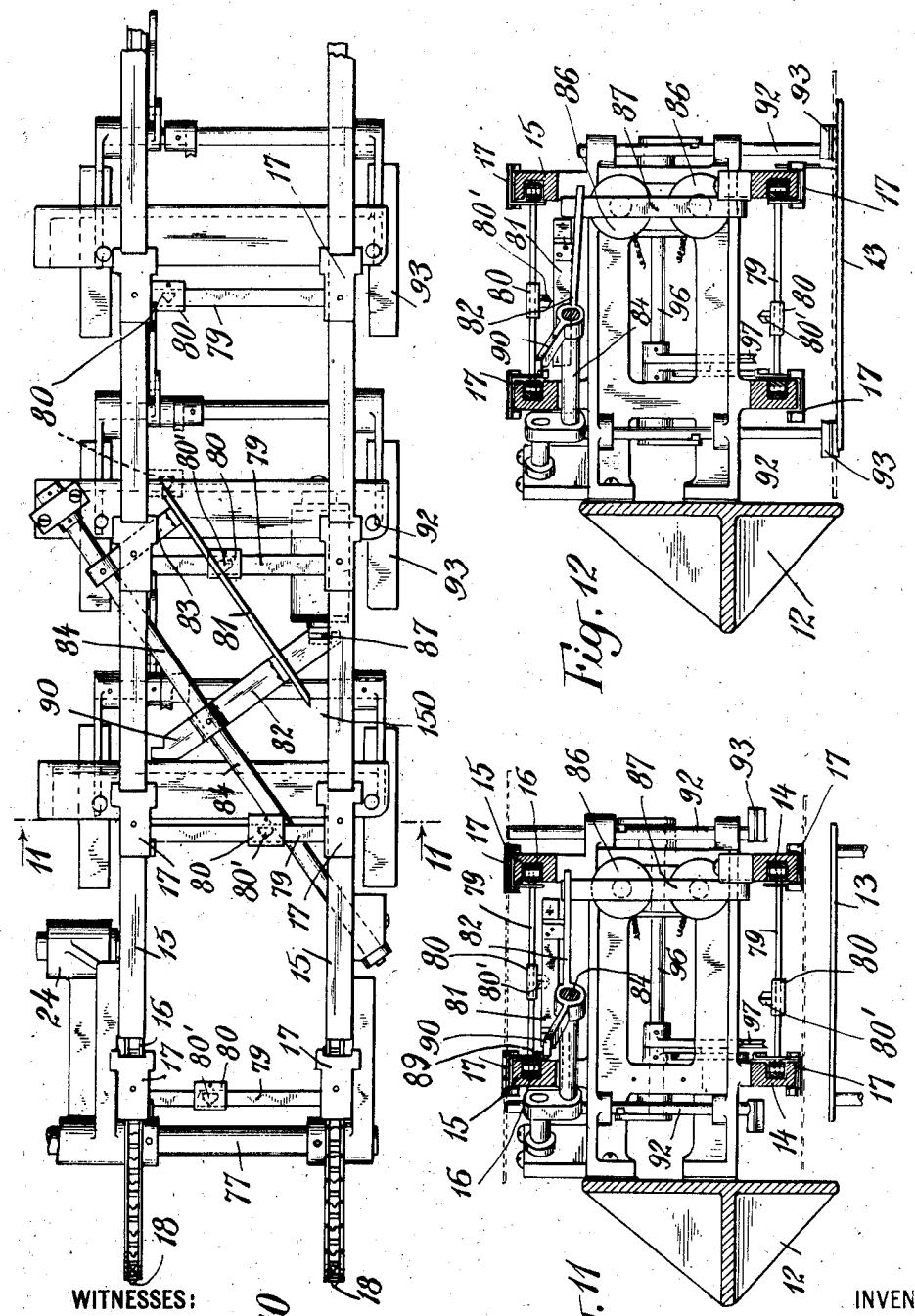

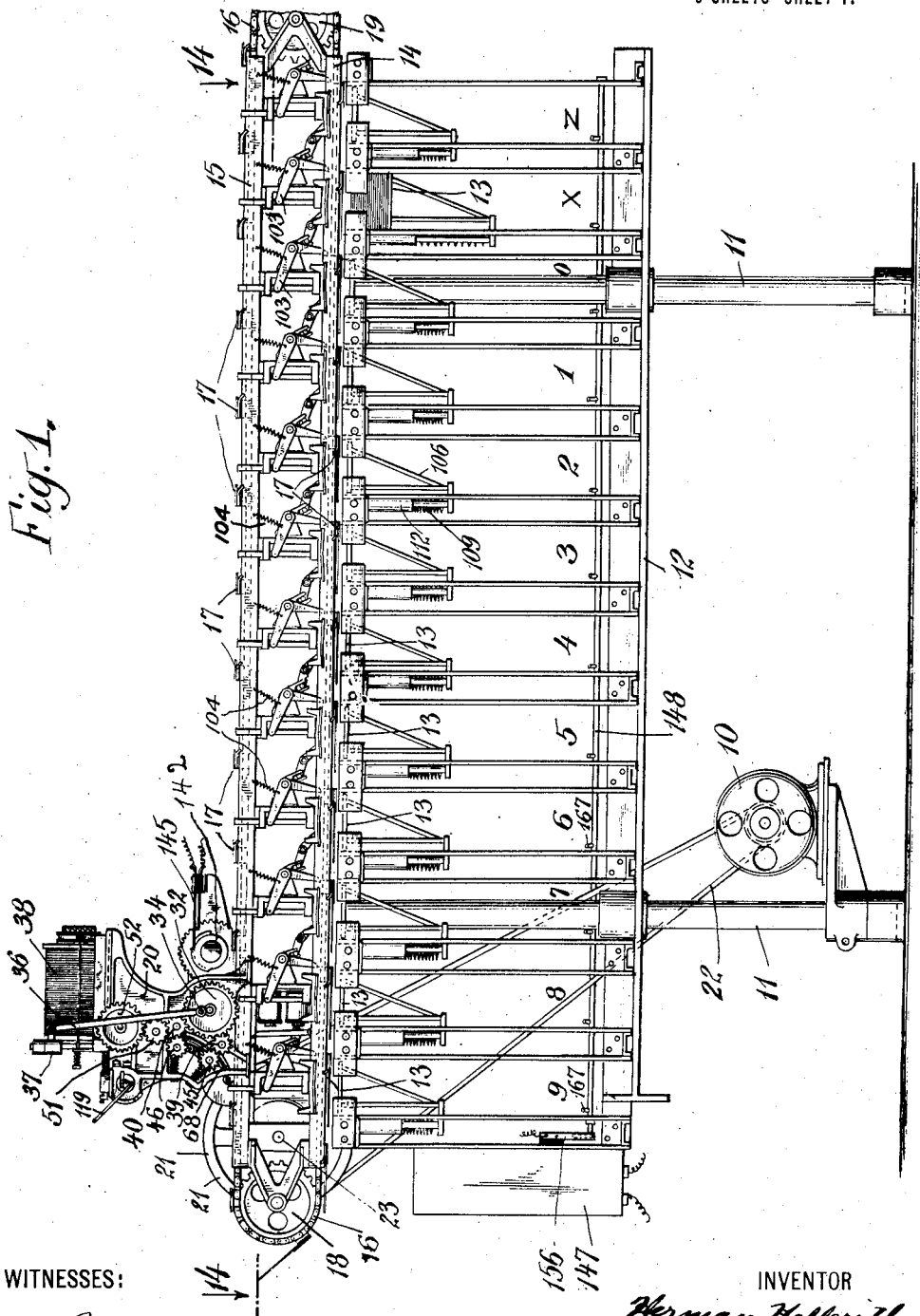

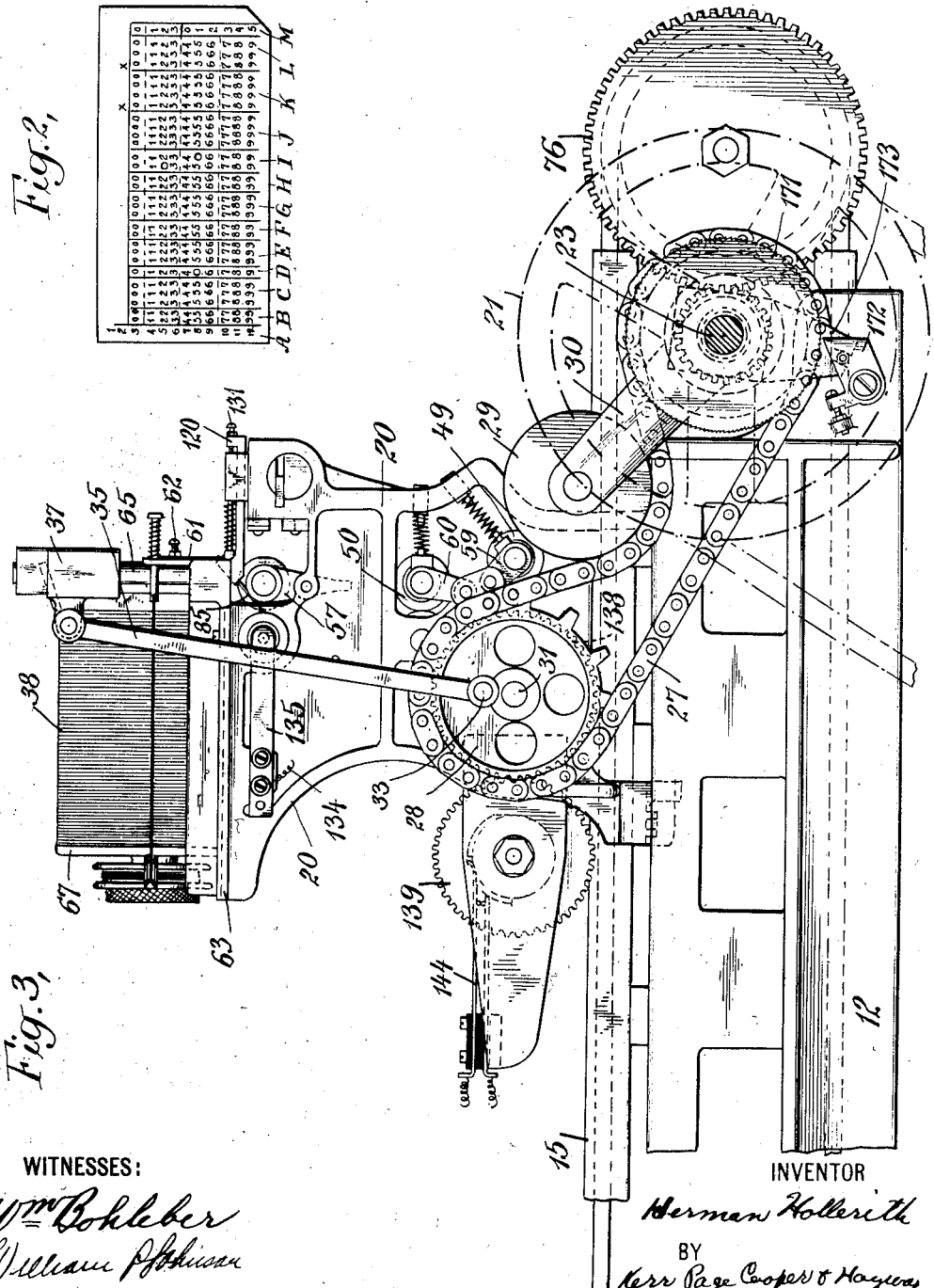

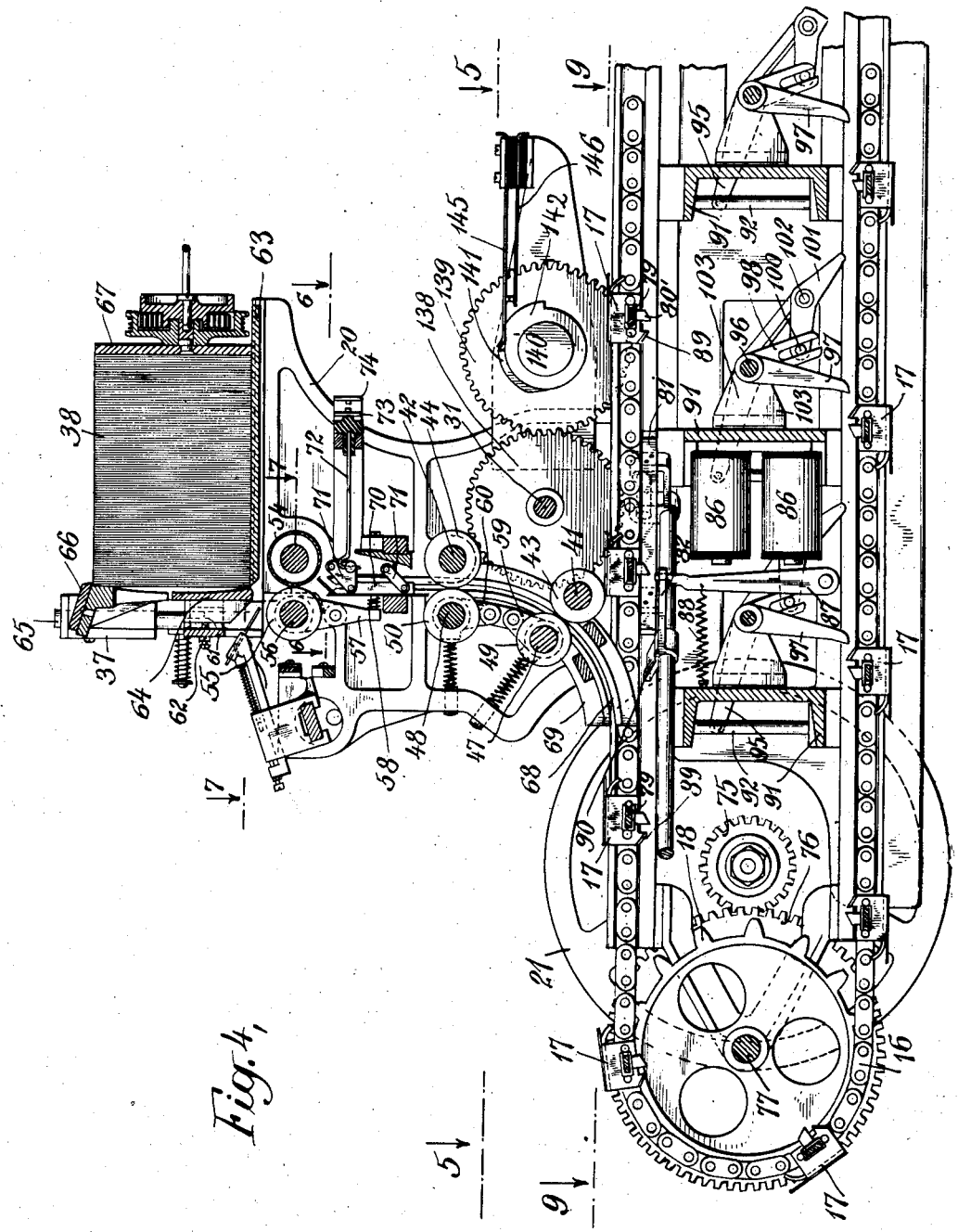

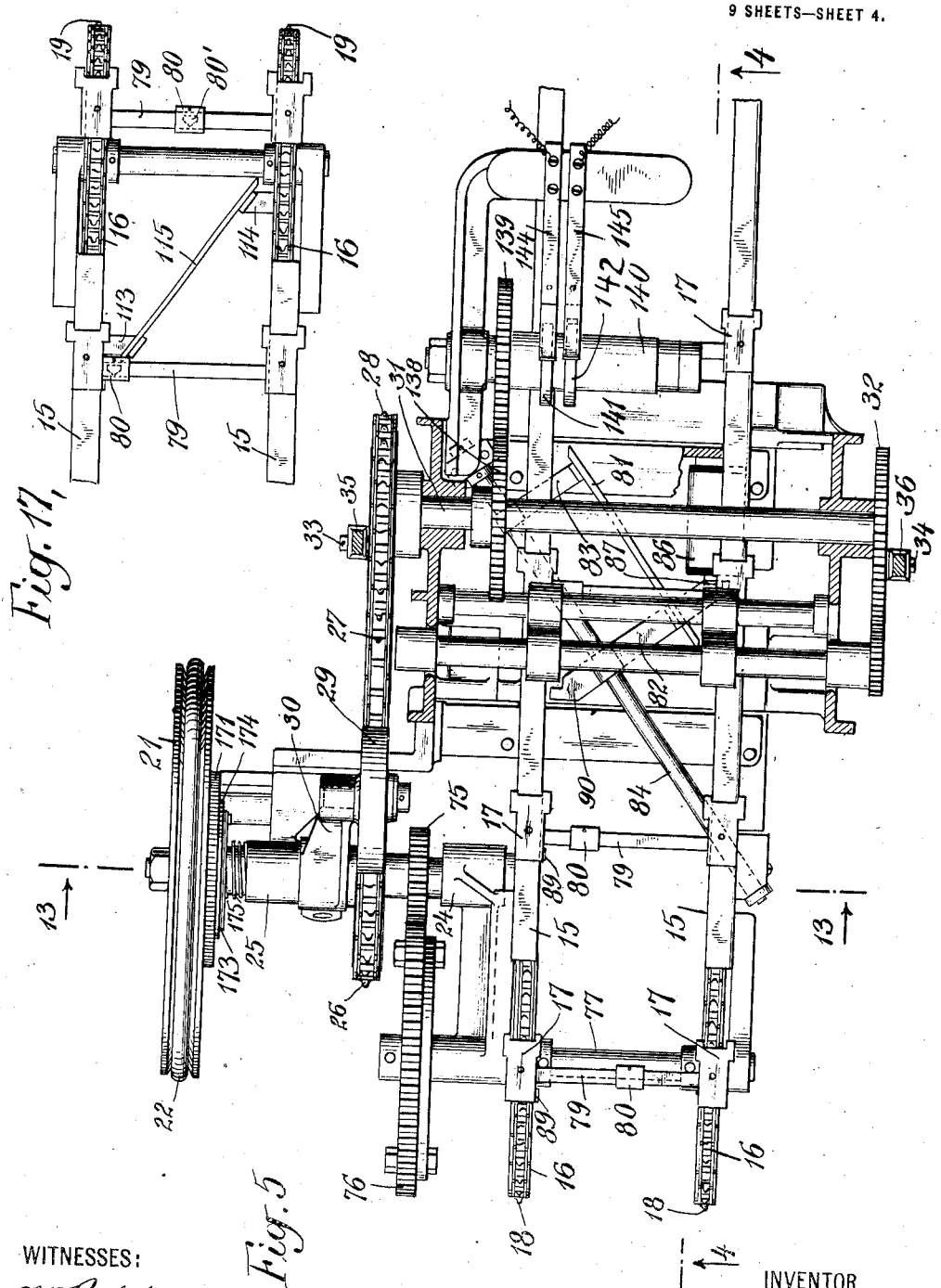

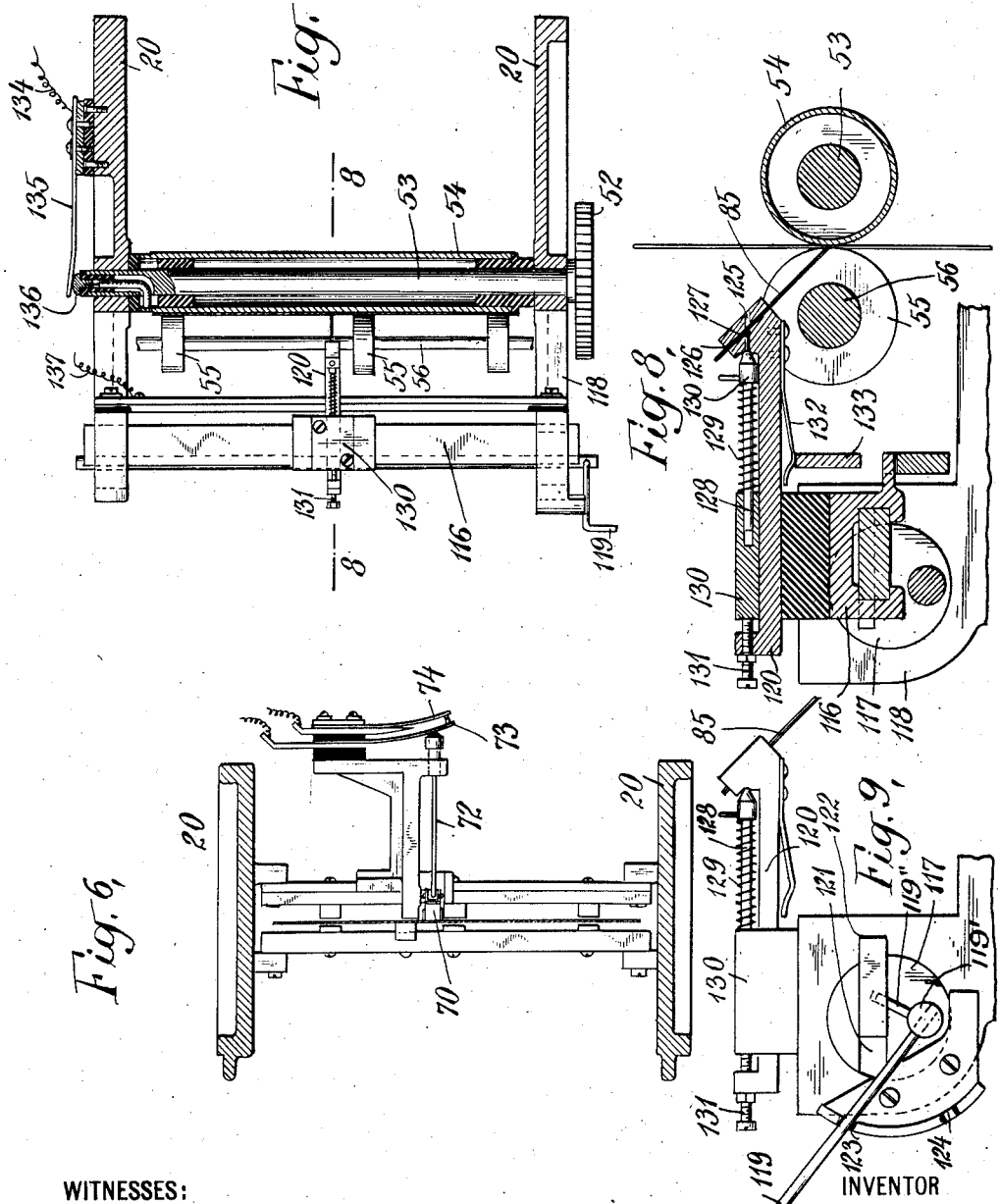

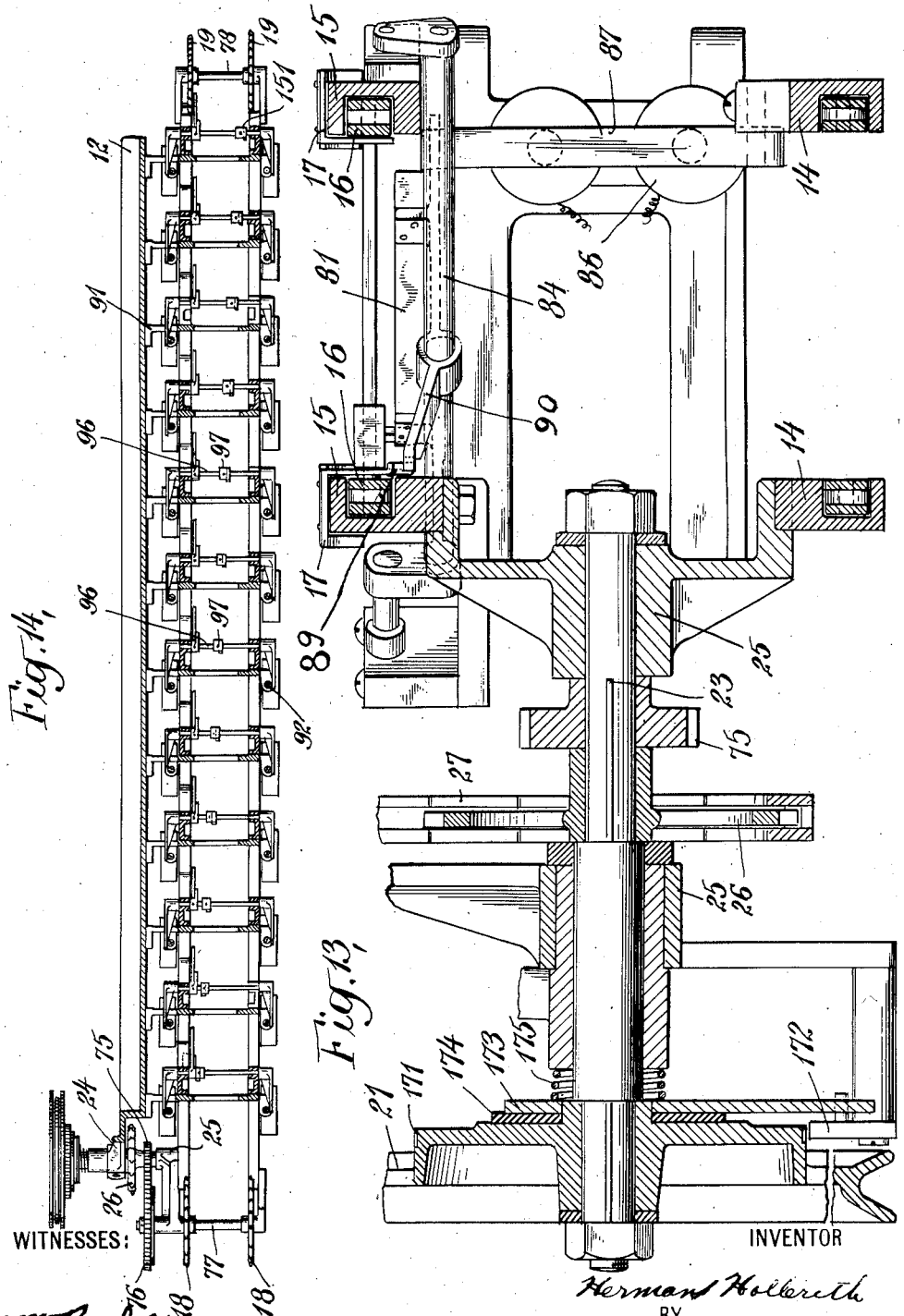

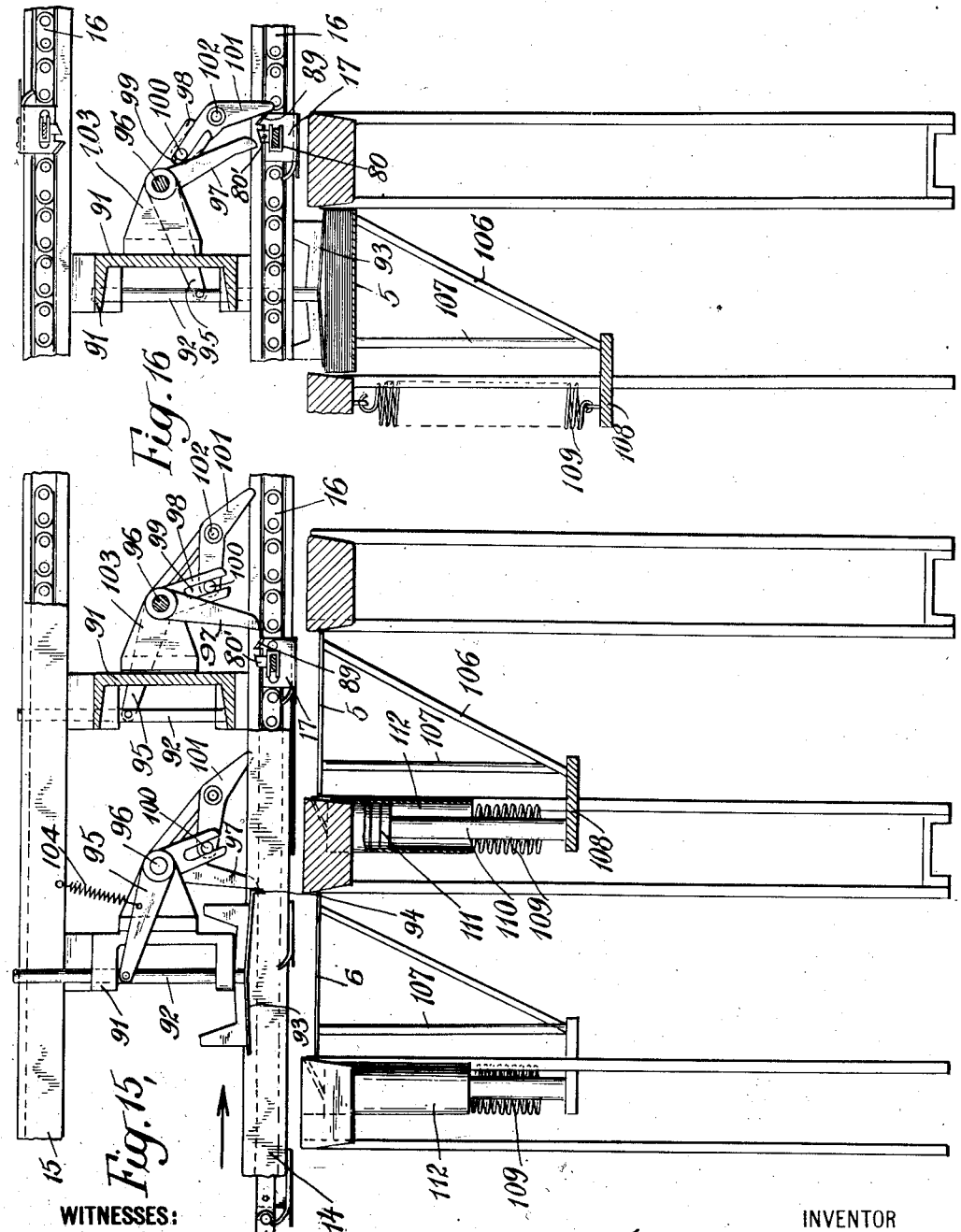

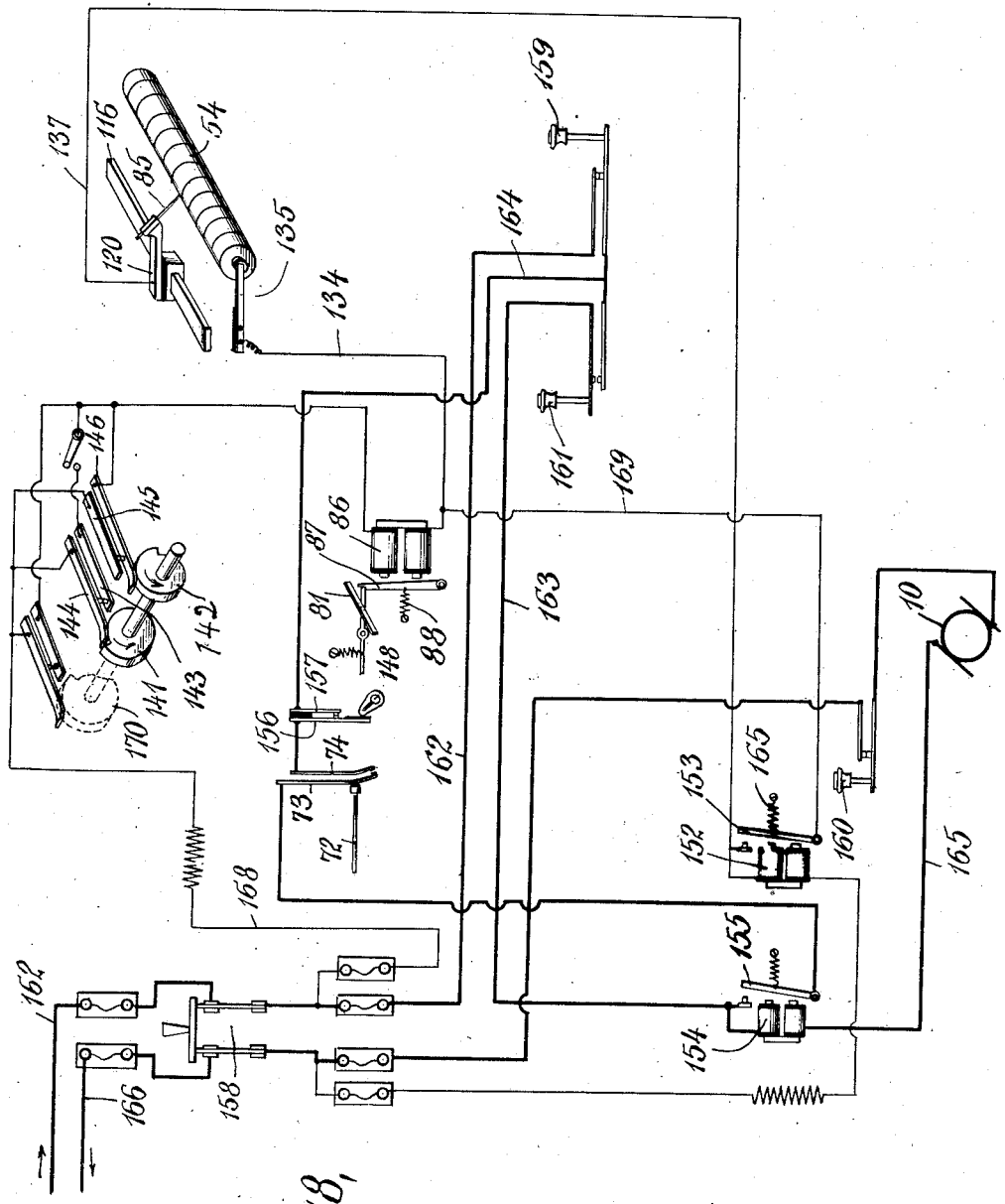

UNITED STATES PATENT OFFICE.

HERMAN HOLLERITH, OF WASHINGTON, DISTRICT OF COLUMBIA, ASSIGNOR TO THE TABULATING MACHINE COMPANY, OF EAST ORANGE, NEW JERSEY, A CORPORATION OF NEW JERSEY.

SORTING-MACHINE.

1,237,646.      Specification of Letters Patent.      Patented Aug. 21, 1917.

Application filed August 9, 1912. Serial No. 714,171.

*To all whom it may concern:*

Be it known that I, HERMAN HOLLERITH, a citizen of the United States, residing at Washington, in the District of Columbia, have invented certain new and useful Improvements in Sorting-Machines, of which the following is a full, clear, and exact description.

This invention relates to sorting machines especially adapted for use in the Hollerith tabulating system and by which records employed in that system may be classified. These records consist, preferably, of separate cards upon which the index-points are formed by punching holes through the cards, the value or character of the item thus recorded on each card being denoted by the position of the index-point. The index-points on the cards control electric circuits which are closed through the holes when the records are in operative or control position; but my invention is not limited to use in any particular system or with any particular classes of records or to any special arrangement of or means of forming the index-points or the employment of an electric circuit or circuits.

The primary object of the present invention is to enable a relatively large number of record cards to be accurately and rapidly assorted or classified. According to my invention when each record card is in its control or operative position devices are set by the record, such devices determining the points of delivery of the cards, and remain in their set positions while the cards are in transit to the sorting stations where their delivery is completed through the instrumentality of means controlled by the devices set by the records. After a device is set by the record of a particular card other cards may successively be brought into position to control other like devices, so that a plurality of cards may be in transit at one time to the same or different sorting stations.

Referring to the drawings which show one embodiment of the invention.

Figure 1 is a side elevation.

Fig. 2 is a view of a record card.

Fig. 3 is an enlarged view of the front portion of the machine, but on the side opposite the side presented in Fig. 1.

Fig. 4 is a section taken on line 4—4 of Fig. 5 viewed in the direction indicated by the arrows.

Fig. 5 is a longitudinal section of the mechanism taken on line 5—5 of Fig. 4 as viewed in the direction indicated by the arrows.

Fig. 6 is a section on line 6—6 of Fig. 4 as viewed in the direction indicated by the arrow.

Fig. 7 is a section on the line 7—7 as viewed in the direction as indicated by the arrow.

Fig. 8 is a sectional detail taken substantially on the line 8—8 of Fig. 7.

Fig. 9 is an end view of a detail.

Fig. 10 is a top plan view with frame 19 removed therefrom, taken on the line 9—9 of Fig. 4.

Fig. 11 is a cross section taken on the line 11—11 of Fig. 10.

Fig. 12 is a view similar to Fig. 11 showing the mechanism in a different position.

Fig. 13 is an enlarged cross section of the machine taken on the line 13—13 of Fig. 5 looking in the direction indicated by the arrows.

Fig. 14 is a longitudinal section taken on the line 14—14 of Fig. 1 and looking in the direction indicated by the arrows.

Figs. 15 and 16 are enlarged detailed views of certain features of the mechanism.

Fig. 17 is a further detailed view.

Fig. 18 is a diagrammatic view of the electric circuits.

With a view of conveying a better understanding of the object, function and operation of the machine I will refer briefly to a typical record shown in Fig. 2 arranged for use in the compilation of freight-transportation statistics. Each such "record" or "record card" represents a way-bill and when properly punched contains all necessary information relating to each consignment which it is desired to tabulate. The record-card shown is provided with twelve divisions of index point positions which provide for the following designations: (A) the month, (B) the day of shipment, (C) the receiving station, (D) the line by which the shipment was made, (E) the forwarding station, (F) the forwarding date, (G) the waybill number, (H) the commodity, (I) the weight, (J) the proportional charge, (K) advances, and (L) the prepaid charges. In addition I show at (M) what I prefer to call a "split-column". The index point positions are denoted by numerals printed in columns on the cards and each division may be composed of one or more columns, or parts of columns as required. Taking divisions D and I as examples, each road or section of the road over which the shipment may be made is represented by a number. To designate the road the corresponding number is punched in division D, while the weight of each shipment may be designated in division I by punching the corresponding numerals therein. In tabulating the records the totals of weight and values are compiled or counted by suitable registering devices and in connection with such tabulation or by a distinct operation as will be described below, the cards, in order to obtain a proper subdivision of the data, are sorted into groups according to the data on the cards. Thus it may be desired to obtain the total weight of shipments for a certain period and at the same time to sort or classify the records relating to these shipments according to the road or section of road over which the shipments were made. While it is obvious that the sorting or classifying, which is accomplished by the particular form of apparatus shown, may be under any of the divisions shown on the card illustrated in Fig. 2, at the same time, in order to avoid confusion, and with a view to abstain from any prolixity of description, I have elected to describe the operation of the machine in classifying or sorting the cards in accordance with the line or road of shipment whose data will be indicated by division D of the record-card. The method of classifying under any other division will then be readily understood from an understanding of the method of classifying under division D.

The cards having been properly punched are fed one by one into position to effect the operation of circuit controlling devices which govern the action of mechanism according to the location of the index point of each card, such mechanism subsequently controlling the deposit of the cards in the proper group. The groups are formed by depositing the cards at different points or sorting stations, and for the purpose of preserving the classification effected by the machine a separate sorting station is preferably employed for each group. These stations are designated in Fig. 1 by the letter "X", and the numerals "0" to "9" inclusive.

The reference numeral 10 designates a motor which serves as the prime mover to operate the sorting machine and is preferably located upon the standards 11, the latter, four in number, supporting the frame or body of the machine. This frame comprises upper and lower supporting members 12 (see Figs. 1 and 14; also 3, 11 and 12) located at one side of the operative parts of the machine and to which two of the standards 11 are directly connected. The trays 13 are supported directly from the lower member 12 while the channel irons 14 and 15, the former serving as longitudinal guides for the lower and the latter for the upper sides of the conveyer chains 16, are supported directly from the upper member 12. The chains 16 carry a plurality of spaced-apart card holders 17 and pass over the sprocket wheels 18 at the front and over the sprocket wheels 19 at the rear end of the machine.

Near the front portion of the machine, and properly mounted upon the channel irons 15 is a supporting frame 20 for the record-cards and their feeding mechanism. The cards are fed forwardly by the said feed mechanism at the time they issue therefrom in the same general direction of movement of the upper flight of the conveyer or traveling carrier, but the speed with which the cards issue from the feed mechanism is greater than the speed of the conveyer, thereby causing the cards to positively engage with the latter. The number of holders or supports 17 is in excess of the number of sorting stations. The distance between the latter and the card feeding mechanism is immaterial, since when each record is in control position devices are actuated to determine its point of delivery, that is, its proper sorting station.

The cards are discharged from the feed mechanism in a plane substantially coinciding with the plane defined by the upper side of the conveyer or traveling carrier. At the beginning of the discharge of a card from the chute the holders 17, located upon the chains 16, for this particular card will have just passed the mouth of the chute and inasmuch as the card is moving slightly faster than the conveyer it will overtake the holders 17 and positively engage itself beneath the spring clip thereof after which it will be carried around to the station which receives all the cards having that particular record. The instrumentalities by which the cards are fed to the conveyer belt and the means for operating the latter will now be described in detail.

As before stated the mechanism is driven by the motor 10 which connects directly with and actuates the pulley 21 by means of a flexible belt 22 said pulley being fixed to a shaft 23 having the journals 24 and 25 (see Figs. 13 and 14) supported by and constituting a part of the frame. Also mounted upon the said shaft 23 is a sprocket wheel 26 over which a sprocket chain 27 is adapted to pass, said chain also passing over a second sprocket wheel 28, an idler 29 being swingingly journaled upon the arm 30 to take up any unnecessary slack in the chain 27 (see Figs. 3, 5 and 13). The gear 28 is fixed upon one end of the shaft 31 while a corresponding gear 32 is located on the other end thereof. The wrist pins 33, 34 of these gears are connected by arms 35 and 36 to a reciprocating cross head member 37 which serves to feed one card at a time from the pack 38. Meshing with and actuated by the gear 32 are two pinions 39 and 40 mounted upon shafts 41 and 42 respectively, said shafts in turn carrying feed-out rollers or drums 43 and 44. Meshing with pinions 39 and 40 respectively are two pinions 45 and 46, the former fixed upon the shaft 47 and the latter upon the shaft 48 and upon the said shafts 47 and 48 are two feed-out rollers 49 and 50 respectively for coöperating with the feed-out rolls 43, 44. An idle gear 51 mounted upon a short shaft projecting from the frame 20 is also driven by the pinion 40 for rotating a gear 52 mounted upon one end of a shaft 53 which carries an insulated drum 54 (see Fig. 7). Engaging with this drum 54 is a plurality of friction members 55 which are adjustably mounted upon the shaft 56 the latter in turn journaled in one end of the pivoted arms 57, suitable resilient means 58 being provided to maintain the members 55 in frictional contact with drum 54. It may also be stated at this point that the shafts 47 and 48 are journaled in pivoted arms 59 and 60 respectively, resilient means being provided to maintain the rollers 49 and 50 in frictional engagement with the rollers or drums 43 and 44 respectively.

The record cards are supported upon the platform 63 and adjacent to one end thereof is a gage-bar 64 which is fixed upon the guides 65 and extends across the frame 20 of the machine. This gage bar is so mounted that the distance between the edge of the platform and the said bar can be accurately adjusted to provide a slot between said platform and bar to accommodate cards of varying thickness. This adjustable mechanism comprises a bar 61 and an adjusting screw 62 therefor (see Fig. 3). The reciprocating member or cross-head 37, which slides upon the guides 65, is provided with a plate 66 which projects beyond the face of the crosshead a distance slightly less than the thickness of a card. A follower plate 67 is held against the cards by means of a resilient mechanism clearly indicated in Fig. 4. Suffice to say with regard to this mechanism that the follower-plate exerts a constant pressure against the cards and holds them firmly against the gage-bar 64 and the crosshead 37 so that, when the latter has previously been lifted to its highest point and begins to descend, the plate 66 will engage the top edge of the first card and carry it down through the opening in front of the gage-bar 64. The card after passing partly through the said opening will be engaged by the drum 54 and friction members 55. From this point the card proceeds downwardly between guides 68 and 69. A movable member 70 pivoted to the arms 71 lies normally in the path of the card but as soon as it is engaged by the card it is moved sufficiently to cause a rod 72 to close the insulated spring contacts 73 and 74. (See Figs. 4 and 6). When contact is so made the circuit is closed, but at the moment that the last record card is fed from the platform past this member 70 the circuit will be opened and the operation of the machine automatically discontinued. Proceeding downwardly between the guides 68 and 69 by the rotation of the drum 54 and members 55 the cards are engaged successively by the drums 44, 50 and 43 and 49 respectively. The gearing is so constructed, as will be apparent from the side view of Fig. 1, that the drums 43, 44, 49 and 50 revolve at about twice the speed of drum 54 and the coöperating members 55.

Upon the driving shaft 23 is fixed a spur-gear 75 (see Figs. 3, 4, 13 and 14) which meshes with and actuates another gear 76 which is fixed upon the shaft 77. (See Fig. 14.) Upon this shaft 77 are mounted the sprocket wheels 18 over which the sprocket chains 16 are adapted to pass. The opposite end of the machine is provided with a corresponding shaft 78 upon which the corresponding sprocket gears 19 are mounted. It will therefore be apparent that when motion is imparted to the driving shaft to operate the feed mechanism the conveyer will be simultaneously operated by means of the spur-gears 75 and 76, and moved over the sprocket gears 18 and 19. As before stated it is essential that the cards be fed from the lower end of the chute constituted by the guides 68 and 69 at a speed in excess of the speed imparted to the conveyer. It is also essential that the card holders 17 be slightly in advance of the chute as the cards issue therefrom and it will be understood that the accelerated speed with which the cards issue from said chute permits them to overtake and engage with the holders 17 on the conveyer. It will therefore be apparent from the foregoing that the means for delivering the record to the stations comprises a single track or conveyer which moves or carries the cards to all of the sorting stations through a single or common path or plane of movement. After the cards are given over to the conveyer they are transported to and deposited in one of the stations 9, 8, 7, 6, 5, 4, 3, 2, 1, 0, X, depending upon the numeral or character punched on the different cards. The conveyer in addition to having the card supports or holders 17 is provided with devices which determine the point of delivery of each record, such devices being designed to be actuated when the records are in control or operative position. In other words, the records when being fed from the pack regulate or control the position of certain devices which latter, when the records approach their proper stations, control or actuate other devices to complete the delivery of the records. According to the means shown, the conveyer chains are provided with cross-bars 79 upon which are slidable members 80 which I have denominated "selectors" since each is variably movable on its support, according to the location of the index-point on the respective record-card, and when positioned these selectors control the discharge of the cards into the proper sorting stations. The number of cross bars 79 is preferably slightly in excess of twice the number of sorting stations in any particular machine. Each selector 80 is free to slide the entire length of its respective supporting bar 79. Without mentioning for the moment the means for sliding the selectors let it be assumed that a record-card whose index "5" in column "D" has been punched therefrom is now engaged by and is passing between the conducting drum 54 and the companion members 55. The selector for this particular card at the instant that it is engaged by drum 54 and members 55 will be substantially in the dotted line position shown in Fig. 10 in engagement with the bar 81 which makes an angle of about 45° with the cross-bars 79, and as the conveyer travels along the selector will be moved longitudinally of its support until freed from engagement with bar 81. The latter, which is in the path of a stud 80' depending from the selector, is carried by arms 82 and 83 mounted on a rotating shaft 84 which is suitably supported from the channel irons 15. Now as the movement of the card between drum 54 and members 55 is continued a brush 85 sooner or later makes contact with the conducting drum 54 through the index-point in the record card and closes a local circuit which includes a magnet 86. This magnet is provided with an armature 87 (see Figs. 4 and 13) whose upper free end normally engages with the arm 82 to maintain the bar 81 in the path of the selectors 80 but as soon as the circuit is closed in the manner above described the armature will be attracted and the bar 81 dropped out of the path of and hence out of engagement with the selector 80 whose position on its support at this instant will be substantially as indicated in full lines in Fig. 10, and this position, in the illustration given, will correspond to the index-point "5". The cross-bars 79 are preferably located on the card-holders 17. Now the travel of both the conveyer and the card are so timed that the card holder 17, located just above the cross-bar whose selector has been set, will be in the position to receive this card as it issues from the feed mechanism. It will be understood that the local circuit will be closed only momentarily after which the armature will be retracted by the spring 88 to its normal position ready to engage with and hold the arm 82 when the same is returned to its normal position. According to the means shown this return of the arm 82 is effected when extension 90 thereof is engaged by one of a series of cam surfaces 89 which preferably constitute part of the holder 17 on one of the chains 16. It follows that the bar 81 will be in the path of and in position to engage with the next succeeding selector to adjust the same along its support in accordance with the position of the index-point in the succeeding card. For instance, if the character "9" be punched from such succeeding card a very slight movement of the selector will be effected by the bar 81 before the magnet is again excited, the armature attracted and the bar permitted to drop out of the path of the selector so as to leave the latter in the position corresponding to the index-point "9" on the record card. To take one more example, suppose the card issuing from the pack has the index-point "1" punched therefrom: In this case the selector will be moved in synchronism with the movement of the conveyer, almost to the opposite end of its support before the bar 81 is dropped out of the path of the selector by the closing of the local circuit and the attraction of the armature.

After this selector has been automatically positioned on the cross bar in accordance with the index point on the card and the latter transferred from the feeding mechanism to the card holder, the conveyer will carry the card to a position to be discharged into the station which is adapted to receive that card and all other cards similarly punched. For instance, the cards which have the index points "1" "5" and "9" will be deposited in stations "1" "5" and "9" respectively. In other words the positions of the selectors are determined by the index-points of the record cards, and these selectors in turn determine the stations to which the cards will be delivered. Without going into the details thereof for the moment it may be stated that I employ mechanism adjacent each station for removing or discharging the card from the conveyer and the particular mechanism operated by each selector will depend entirely upon the position of the said selector on its support or cross-rod 79. The particular card which I am tracing to elucidate the operation of this feature of the invention is the one that has numeral "5" punched therefrom which by closing the local circuit controlled the position of the selector 80 so as to cause it to engage with the mechanism which discharges the cards from the conveyer onto the tray in station "5."

The mechanism for discharging the cards from the conveyer to the trays is partly shown in Figs. 1 and 4 but a better understanding thereof will be conveyed by reference to Figs. 10 to 16 inclusive. Located directly above each station between the upper and lower angle irons 14 and 15, and constituting a part of the frame of the machine, are crosspieces 91 (see particularly Figs. 15 and 16) the flanges of which serve as guides for the plunger rods 92. To the lower ends of these rods are secured approximately horizontally disposed card discharging members 93, having each a downwardly projecting flange 94 on the forward end thereof which is moved downwardly at the proper time into the path of the card to release the same from the holders on the conveyer. To the rod 92 is pivotally secured one end of a lever 95 the other end thereof being fixed to a shaft 96 which is suitably journaled in the frame. Fixed to and projecting downwardly from this shaft are a trigger 97 and an arm 98, the latter provided with a longitudinal slot 99 for the pin or stud 100 on a lever 101 the latter being pivoted at 102 to an arm 103 which is secured to the cross piece 91. The various triggers 97 are differently positioned on their shafts 96, as shown in Fig. 14. Hence the reason for positioning the selectors 80 to operate any particular card discharging mechanism. It has been assumed that the stud on the selector 80 shown on the right-hand side of Fig. 15 is in position to engage with the discharging mechanism, and the latter is in the position, just before being engaged by the selector 80, as indicated by this view. Just as the stud 80′ of the selector 80 contacts with the trigger 97 and moves the same around the axis of the shaft 96 as a center the plunger rods 92 will be forced downwardly by means of the levers 95. The downward movement of the rods 92 positions the protruding flange 94 of the member 93 into the path of the card and positively disengages the same from its holder on the conveyer just as the card is in proper position over the tray 5. It will therefore be observed that the selecting means is operated in synchronism or timed relation with the conveyer for controlling the operation of the means for disengaging the cards from the conveyer in accordance with the index-points on said cards to effect their delivery to the sorting stations corresponding to said index-points. The spring 104 holds the transferring mechanism in normal position but the rapidity with which the conveyer is operated is too great on account of the lag in the spring to bring the parts back from the position shown in Fig. 16, and especially is this true where a series of cards is discharged successively upon the same tray. This will be obvious by making mention of the fact that the machine is designed to assort any number up to three hundred cards per minute and unless some mechanism be provided for positively and quickly returning the card discharging member 93 and its associated mechanism to normal position the succeeding card, under such a high rate of speed, may be prematurely discharged from its holders 17. The means for accomplishing this purpose will now be described. It will be remembered that the movement of the trigger 97 around the axis of the shaft 96 as a center produces a downward movement of the rods 92. This movement of the trigger 97 imparts an upward movement to the arm 98 and the latter in turn causes one end of the lever 101 to move into the path of the cam surface 89 projecting upwardly from the card holder 17. As soon as this cam surface contacts with lever 101 (Fig. 16) the lower end thereof is cammed upwardly and owing to the connection between the stud 100, arm 98, shaft 96, lever 95 and rod 92 the card discharging member is instantly returned from its lowered position.

The trays are located upon suitable standards 106 and 107 which are connected at their lower ends to a member 108 this member in turn being connected to a spring 109 which supports the tray and further connected to a piston rod 110 of a piston 111 which reciprocates in the dash-pot 112. The dashpot prevents a too sudden return of the tray whenever the assorted cards are removed therefrom. After a card has been discharged from the conveyer the selector which effected such discharge and thereby completed its delivery, must be returned to its initial position on its support so that it may be again moved the necessary distance corresponding to the index-point of the next record card whose discharge it is to control. The means for returning the selectors to their starting points or initial positions is shown in Fig. 17, and, briefly stated, embodies a fixed member diagonally disposed in the path of the selectors so that by engaging therewith the latter will be moved on their supports transversely of the conveyer. This selector-returning member is shown in the form of a diagonally-disposed bar 115 held by supports 113, 114 in the path of the studs 80′ of the selectors. When the studs contact with this bar the selectors are moved thereby along their supports toward one end thereof. A space is left between the forward end of bar 115 and the channel iron so that the studs may pass free from said bar as soon as the selectors are at the starting points on their supports. I have shown this mechanism located upon the extreme rear of the machine so as to return the selectors to their starting points after they have passed the several sorting stations, but this is a matter of choice, since the bar may be located at other points.

The function of the station or compartment Z is to receive bastard cards, that is those that have no record or perforation thereon in the particular-column the index-points of which are designed to control the sorting of the cards. The record may have been inadvertently omitted, or cards may have been accidentally mixed with the cards that have proper records thereon, or for one reason or another the record may have been purposely omitted therefrom and it is desired to assort those that have records from those that do not have records. Or it may be that the contacts or devices controlled by the cards fail to operate properly. If a card has no perforation or record in the column for which the contact 85 has been set, or if the contacts fail to operate, the magnet 86 will not be energized, hence the selector-shifting bar 81 will not drop out of the path of the stud on the selector 80 with respect to the particular card in question. Hence the selector 80 will be slid to the extreme opposite side of its cross-bar 79 by the shifting bar 81 and will pass through the space 150 between such bar 81 and the channel iron 15. (See Fig. 10). The selector will thus be in the extreme position on bar 79 indicated at 151 in Fig. 14 and operate the discharging mechanism of station "Z" to discharge the bastard cards onto the tray located therein.

The brush 85 and the mechanism for supporting it are best shown in Figs. 7, 8 and 9. The member 116 upon which the brush is slidably mounted so that it may be moved longitudinally thereof, is provided with circular journals 117 bearing in the extensions 118 of the supporting frame 20. Turning of the bar 116 is effected by a handle 119 secured to one of the journals 117 at one side of its center preferably by means of a rotatable rod 119'. This rod is provided with short upwardly projecting bars 119" adapted to take in recesses in the under face of the projecting ends of the bar 116. When the handle 119 is turned such bars 119" will effect a movement of the bar 116 relative to its journals 117. In Figs. 8 and 9 the brush is shown in operative position. If it be desired to throw the brush out of this position the handle 119 (Fig. 9) is turned to the left and this movement will effect a disengagement of the ends of the bar 116 from the slotted portion 122 of the extension 118 of frame 20. After the bar 116 has been wholly withdrawn from the slotted portion of extension 118 continued turning of the handle will cause the bar to turn on its journals 117 and the part will assume the position shown in Fig. 4. Reverse movement of the handle will return the parts to operative position. By the mechanism described the brush is brought into actual contact with the drum by a straight line movement and not by a rotary movement. The handle is constructed of resilient material and when moved to its extreme positions will snap behind the shoulders 123 and 124 thus locking the brush in position. The member 120 serves as a conductor and is insulated from the member 116. The head of the member 120 is provided with two perforations 125 and 126 which cross each other, as shown in Fig. 8, in one of which the brush is lodged and in the other of which a pin 127 from the spring pressed plunger 128 is insertible to engage and hold the brush in adjusted relation. The tension of the spring 129 is regulated by the block 130 which is adjustable from and toward the head by means of the screw 131. Secured to the member 120, preferably at the head thereof, is a contact spring 132 which contacts, when the brush is in engagement with the drum, with the conducting bar 133 which is connected to but insulated from the frame 20. When the brush is in contact with the drum 54 the circuit is completed as follows: The current enters from the wire 134 (see Fig. 7) passes through the spring contact 135, then contact 136, drum 54, brush 85, member 120 to spring contact 132, conductor bar 133 and out to the wire 137.

Mounted upon the shaft 31 is a third spur gear 138 meshing with and actuating a corresponding gear 139 fixed to the shaft 140, also fixed to this shaft are two cams 141 and 142 (see Figs. 5 and 18) which actuate circuit controlling devices in the record-actuated circuit. The cam 141 is adapted to control contacts 143, 144, while the cam 142 is adapted to control contacts 145, 146. The latter are closed before the contacts 143, 144, are opened.

On the box 147 (see Fig. 1) I provide contacts 156, 157, situated in the motor circuit. (See also Fig. 18). These contacts are broken by means of a partially rotatable rod 148 whenever any one of the trays 13 engages with and depresses one of the fingers 167 extending laterally from the rod, thus automatically stopping the operation of the machine.

The particular embodiment of my invention which I have selected for description and illustration is adapted and arranged for electrical operation. The circuits and connections therefor are diagrammatically represented in Fig. 18. The electrical features comprise a circuit controlled by the record cards which includes two separable contacts, one of which is the insulated conducting drum 54 supported by the frame 20. The cards pass across this drum on their way from the stack 38 to the conveyer. Preferably this drum is graduated by lines to correspond with the division or grouping of the cards. The other contact consists of the conducting brush 85 suitably connected to the circuit and slidable on the insulated rod 116, in position to engage with that division of the drum 54 to which it may be adjusted. These contacts are separated and this circuit is broken at this point when a card is inserted between them, and it is closed when the card is removed or when a hole in a card permits the resilient brush 85 to contact with the drum 54. This card-controlled circuit includes the coils of the magnet 86, the spring contacts 143, 144 and 145, 146 (which are actuated by the cam rollers 141 and 142 respectively), the relay magnet 152 having a conducting armature 153, the wire 137, and the connection between the relay magnet 152 and the outlet 166. In parallel relation with the record controlled circuit is the "motor circuit" shown in heavy lines in Fig. 18. This circuit includes the relay magnet 154 having a conducting armature 155, and the electro-motor 10 by which the apparatus is operated. A branch circuit is also provided which includes the normally separated contact springs 73, 74 (see also Fig. 6) which are controlled by the cards, the normally closed contact springs 156, 157 which are controlled by the number of cards in the station, and the armature 155 of the relay magnet 154. A main switch 158 is provided at any convenient point in the line and one or more normally closed switch keys 159 and 160 are provided at any convenient points by which the motor circuit can be instantly opened and the machine stopped.

The operation will be readily understood by reference to Fig. 18. Assuming that the punched cards are placed all the same way upon the platform 63 the machine is started by closing the main switch 158 and the key 161. The main current entering by wire 162 will then pass through the contacts operated by keys 159 and 161 to wire 163 leading to the motor 10 but before entering the motor the current in passing through the coils of the relay magnet 154 attracts the armature 155. The current cannot pass to the coils of this magnet via wire 164 until the first card closes the contacts 73, 74 hence it will be necessary to hold down the key 161 until the first card engages with the member 70 (see Figs. 4 and 6) and closes contacts 73, 74 after which the key 161 is released and the current will then travel through wire 162, contact switch 158, wire 164, armature 155, coils of magnet 154, wire 165, to the motor 10 and thence to the outlet 166 through the key-operated contact 160. To stop the motor it is only necessary to break the circuit by manipulating either key 159 or 160 in the motor circuit. The motor will be automatically stopped when the last card from the card platform ceases to act upon the member 70 to hold the normally separated spring contacts 73, 74 in engagement with each other. It may happen that the operator will neglect to remove the cards from the stations at the proper periods. In this case, that is when a compartment is filled with cards, the tray will engage with its respective finger 167 on rod 148 to break the contact at 156, 157 which is in series with the contact 73, 74, thus allowing the armature 155 to be retracted, the circuit broken at this point, and the machine automatically stopped. A part of the current passing by wire 162 will branch into the wire 168 and will traverse said wire through the spring contacts 143, 144, and 145, 146 which are arranged in parallel. The contact 145, 146 is held closed as the brush is passing over the last index point positions on the card but is automatically opened just before the card passes from under the brush 85. The object of this is to prevent the closing of the record-controlled circuit and consequent action of the magnet when the spaces between the moving cards permit the brush to contact with the conducting drum. The contact 143—144 is held closed while the card is passing under the brush 85 but is automatically broken at any time after the positive closing of contacts 145—146 and is not made again until the succeeding card begins to pass under the brush. I employ a branch wire 169 beyond the magnet 86 in parallel with the wires connected to the conducting drum the said branch being connected to the armature 153 of the relay magnet 152. I employ this wire to shunt a part of the current to prevent sparking between the brush and drum contact which would otherwise take place if the current necessary to operate the magnet 86 were permitted to pass through said brush incidentally this connection serves to keep the current flowing through magnet 86 after the current through the record-controlled contacts 54—85 is interrupted by a passing card.

The split column (M) may serve for two or more arbitrary designations. When sorting cards according to the lower series of index-point positions "0" to "5" (see Fig. 2) no change in parts is necessary as the magnet will be energized and the proper selector set in accordance with the hole punched in said series. Should there also be a hole punched in the second or upper series of index-point positions "0" to "3" the brush contact will be made as usual but without result, since the selector shifting bar is not then in position to be effective, having been moved upon control being established through the index-point in the lower series of index point positions. When it is desired to assort cards according to the upper series of index-point positions the circuit through contact 143—144 is broken by means of a suitable switch (Fig. 18) and the circuit passing through the contact operated by cam 170 (shown in dotted lines, Fig. 18) is closed at the moment the brush begins to pass over this designation. In sorting according to the second series of index-point positions the cam 142 operates in the usual manner, but it should not close contacts 145, 146 until the last index-point position is between the brush 85 and drum 54.

The pulley 21 is provided with ratchet teeth 171 (see Figs. 3 and 13) which are engaged by an adjustable pawl 172 whenever it is attempted to operate the machine backwardly. To the pawl 172 is connected an arm 173 hung on the hub of pulley 21. A spring 175 is employed to maintain said arm in frictional engagement with a friction member 174. Any backward movement of the machine will result in a rotative tendency of the arm 173 and cause the pawl 172 to engage with teeth 171 and arrest further movement in this direction.

It is to be understood that the specific embodiment shown and described is simply the preferred form of my invention and that I do not limit myself to the construction shown as many departures may be made in point of detail and other modified forms resorted to without departing from the true spirit and scope of the invention.

What I claim is:

1. A sorting device comprising a series of sorting stations, a conveyer common to all the stations, means for feeding record-cards to said conveyer, record-controlled means carried by said conveyer positioned for controlling the discharge of the cards from the conveyer, and means controlled by the last mentioned means for discharging the cards from the conveyer.

2. In an apparatus for sorting record-cards according to the location of index-points thereon, the combination with card-feeding means, of a plurality of sorting stations, one for each index-point position, conveying means common to all the stations, and means on said conveyer movable in synchronism or timed relation with said conveying means for effecting the discharge of the cards into the stations according to the location of the index-points, said last mentioned means being controlled by such index-points.

3. In an apparatus for sorting record-cards, a conveyer for the cards, and means for disengaging the cards from the conveyer comprising an actuating device carried by said conveyer and a device actuated thereby, one of which is variably controlled by the record-card.

4. In an apparatus for sorting record-cards, a conveyer for the cards, and means for disengaging the cards from the conveyer comprising an actuating device carried by said conveyer and a device actuated thereby, said actuating device being variably controlled by the record-card.

5. In a sorting-apparatus for record-cards having index-points thereon, a plurality of sorting stations corresponding to the index-point positions on said cards, means for conveying each record-card to the station denoted by its index-point including a device controlled through the instrumentality of the record of each card when in its operative position, and means controlled by said device, when the record-card approaches its station, to effect its delivery thereto.

6. In a sorting-apparatus for record-cards having index-points thereon, a plurality of sorting stations corresponding to the index-point positions on said cards, means for conveying each record-card to the station denoted by its index-point including a device set through the instrumentality of the record of each card when in its operative position, and means actuated by said device, when the record-card approaches its station, to effect its delivery thereto.

7. In a sorting-apparatus for record-cards having index-points thereon, a plurality of sorting stations corresponding to the index-point positions on said cards, means for conveying each record-card to the station denoted by its index-point including devices actuated when each record is in its operative position to determine the point of delivery of the record-card, and means operated, when the card approaches such point, to effect its delivery.

8. In a sorting-apparatus for record-cards having index-points thereon, a plurality of sorting stations corresponding to the index-point positions on said cards, means for conveying each record-card to the station denoted by its index-point including devices actuated when each record is in its operative position to determine the point of delivery of the record-card, and means operated by said devices, when the card approaches such point, to effect its delivery.

9. In an apparatus for sorting record-cards having index-points thereon, a plurality of sorting stations, means for feeding the cards, a single path of travel for the cards between said feeding means and said sorting stations, means controlled through the instrumentality of the record of each card when in its operative position, and means controlled by the last mentioned means as a cord reaches its respective sorting station to discharge said card.

10. In an apparatus for sorting record-cards having index-points thereon, a plurality of sorting stations, means for feeding the cards, a single path of travel for the cards between said feeding means and said sorting stations, means controlled through the instrumentality of the record of each card when in its operative position, and means operated by the last mentioned means when the record-card reaches its respective sorting station to discharge such card.

11. In an apparatus for sorting record-cards having index-points thereon, a plurality of stations, a conveyer for carrying the cards to all of said stations through a common path or plane of movement, means for feeding the cards to and in engagement with the conveyer, means for disengaging the cards from the conveyer, and record actuated means operating in synchronism or timed relation with the conveyer for controlling the operation of said disengaging means to effect the delivery of the cards to the sorting stations corresponding to the index-points thereon.

12. In an apparatus for sorting record-cards having index-points thereon, a plurality of stations, a single path of travel for the cards to the stations, a plurality of card-discharging devices, one for each station, and devices selected by the index-point of each card for separately controlling the card-discharging devices when a card reaches its respective sorting station.

13. In an apparatus for sorting record-cards having index-points thereon, a plurality of stations, a single path of travel for the cards to the stations, a plurality of card-discharging devices, one for each station, and devices selected by the index-point of each card for separately actuating the card-discharging devices when a card reaches its respective sorting station.

14. In an apparatus for sorting record-cards having index-points thereon, a plurality of stations, means for delivering each card to the station denoted by the index-point thereon comprising a plurality of devices set through the instrumentality of the cards when in their operative positions, and a plurality of means controlled by said devices as the records reach their sorting stations.

15. In an apparatus for sorting record-cards having index-points thereon, a plurality of stations, means for delivering each card to the station denoted by the index-point thereon comprising a plurality of devices set through the instrumentality of the cards when in their operative positions, and a plurality of disengaging devices, one for each station, controlled by the last mentioned devices as a card reaches its respective sorting station.

16. In an apparatus for sorting record-cards having index-points thereon, a plurality of stations, means for delivering each card to the station denoted by the index-point thereon comprising a plurality of devices set through the instrumentality of the cards when in their operative positions, and a plurality of disengaging devices, one for each station, actuated by said devices when the records approach their sorting stations.

17. In an apparatus for sorting record-cards having index-points thereon, a plurality of stations, a conveyer for carrying the cards to all of said stations, means for feeding the cards to and in engagement with the conveyer, a plurality of record controlled selectors automatically actuated in timed relation with said conveyer, and a plurality of disengaging means for said cards, one for each station, and controlled separately by one of said selectors according to the index-point on the card.

18. In an apparatus for sorting record-cards having index-points thereon, a plurality of stations, a conveyer for carrying the cards to all of said stations, means for feeding the cards to and in engagement with the conveyer, a plurality of disengaging means for said cards, one for each station, and means controlled by the index-points on said cards for rendering said disengaging means effective as a card reaches the sorting station corresponding to its index point.

19. In an apparatus for sorting record-cards having index-points thereon, the combination with a plurality of sorting stations corresponding to the index-point positions on said cards, a traveling conveyer, means for feeding said cards into engagement with said conveyer, adjustable selectors movable in synchronism or timed relation with said conveyer, card-discharging means controlled by said selectors, and means controlled through the instrumentality of a card for variably adjusting the selectors to determine the particular discharging means to be operated to discharge a card into a station.

20. In an apparatus for sorting record-cards having index-point positions thereon, the combination with a plurality of sorting stations corresponding to the index-point positions on said cards, a traveling conveyer, means for feeding said cards into engagement with said conveyer, adjustable selectors, card-discharging means operable by said selectors, and means controlled through the instrumentality of a card for variably adjusting the selectors to determine the particular discharging means to be operated to discharge a card into a station.

21. In an apparatus for sorting record-cards having index-points thereon, the combination with a plurality of sorting stations corresponding to the index-point positions on said cards, of a traveling conveyer, means for feeding said cards into engagement with said conveyer, adjustable selectors, card-discharging means located adjacent to each of said stations and controlled by said selectors, and means controlled through the instrumentality of a card for variably adjusting the selectors to determine the particular discharging means to be operated to discharge a card into a station.

22. In an apparatus for sorting record-cards having index-point positions thereon, the combination of a plurality of sorting stations corresponding to the index-point positions on the cards, means adapted to engage the cards and move the same in position relative to the sorting stations, card actuated devices carried by last mentioned means, and means for disengaging the cards from said moving means and discharging the same into the stations corresponding to the index-points on said cards.

23. In an apparatus for sorting record-cards having index-point positions thereon, the combination of a plurality of sorting stations, means located in accordance with the index-point positions on the cards, a traveling carrier for said cards, and adjustable means on said traveling carrier actuated through the instrumentality of a card for operating the aforesaid means to discharge the cards from the conveyer into said sorting stations.

24. In an apparatus for sorting record-cards having index-point positions thereon, the combination of a plurality of sorting stations, means comprising operating triggers located in accordance with the index-point positions on the cards, a traveling carrier for said cards, and adjustable means on said traveling carrier actuated through the instrumentality of a card for operating the aforesaid means to discharge the cards from the conveyer into said sorting stations.

25. In an apparatus for sorting record-cards, in combination, a plurality of sorting stations, a traveling carrier, means for feeding the cards to said carrier, card actuated adjustable selectors movable in synchronism or timed relation with said carrier, card-discharging means controlled by said selectors, and means operable in synchronism or timed relation with said conveyer for returning said card-discharging means to normal position.

26. In an apparatus for sorting record-cards, in combination, a plurality of sorting stations, a traveling carrier, means for feeding the cards to said carrier, card actuated adjustable selectors movable in synchronism or timed relation with said carrier, card discharging means controlled by said selectors, and means controlled by the conveyer for returning the discharging means to normal position.

27. In an apparatus for sorting record-cards, in combination, a plurality of sorting stations, a traveling carrier, means for feeding the cards to said carrier, adjustable selectors movable in synchronism or timed relation with said carrier, means controlled by said record-cards for variably adjusting the selectors, card discharging means for each station controlled by said selectors, and means operable in synchronism or timed relation with said conveyer for returning the discharging means to normal position.

28. In an apparatus for sorting record-cards, the combination with card-feeding means, of a plurality of sorting stations, a conveyer provided with adjustable selectors, means for feeding the cards to and in engagement with said conveyer whereby they are delivered from the feed mechanism to said stations, means actuated through the instrumentality of a record card for adjusting the selectors on the conveyer, and means operated by said selectors in accordance with their adjustment on the conveyer for delivering the cards to said stations.

29. In an apparatus for sorting record-cards, the combination with a conveyer, of mechanism for feeding the cards to and in engagement with said conveyer, a plurality of sorting stations for said cards, means for transferring the cards from said conveyer to said sorting stations, and card controlled selectors on said conveyer for operating said means.

30. In an apparatus for sorting record-cards having index-points thereon, the combination with a conveyer, a plurality of sorting stations, means for transferring the cards from the conveyer to said sorting stations, selectors on said conveyer for operating said means, and record card actuated means for adjusting the selectors on said conveyer in accordance with the index-points on the record cards.

31. In an apparatus for sorting record-cards having index-points thereon, the combination with a conveyer, of mechanism for feeding said cards to said conveyer, a plurality of sorting stations for said cards, adjustable selectors on said conveyer, means controlled by the position of the index-points on the record-cards for adjusting said selectors, and means for disengaging the cards from the conveyer and transferring the same to said stations in accordance with the location of the selectors upon said conveyer.

32. In an apparatus for sorting record-cards having index-points thereon, in combination, a conveyer, means for feeding a card to said conveyer, a plurality of sorting stations relative to which the said conveyer is adapted to move, a selector on said conveyer, means controlled through the instrumentality of the index-point on the record-card for adjusting the selector, and means operated by the selector for discharging the card to the sorting station in accordance with the position of the said selector on said conveyer.

33. In an apparatus for sorting record-cards having index-points thereon, in combination, feeding mechanism for said cards, a conveyer, adjustable selectors on said conveyer actuated through the instrumentality of the index-points on said record-cards, sorting stations for said cards, and means operated by said selectors as the conveyer is in motion to discharge the cards into the stations in accordance with the positions of said selectors on said conveyer.

34. In an apparatus for sorting record-cards having index-points thereon, in combination, feeding-mechanism for said cards, a traveling carrier, selectors movable with and relatively to said carrier, and means for effecting such relative movement controlled by the cards.

35. In an apparatus for sorting record-cards having index-points thereon, in combination, feeding-mechanism for said cards, a traveling carrier, selectors movable with and relatively to said carrier, means controlled by said cards for effecting such relative movement, and automatically controlled means for rendering the last mentioned means ineffective.

36. In an apparatus for sorting record-cards having index-points thereon, in combination, feeding-mechanism for the cards, a traveling carrier, selectors movable with and relatively to said carrier, and means for effecting such relative movement, means controlled by the record-cards for rendering the last mentioned means ineffective.

37. In an apparatus for sorting record-cards, in combination, feeding mechanism for the cards, a traveling carrier, selectors movable with and relatively to said carrier, means in the path of said selectors for effecting such relative movement, and means controlled by the record-cards for removing the last-mentioned means out of such path when the necessary relative movement has been attained.

38. In an apparatus for sorting record-cards, in combination, feeding-mechanism for the cards, a traveling carrier for the cards, selectors movable with and relatively to said carrier, means in the path of said selectors for effecting such relative movement, means controlled by the record-cards for moving the last mentioned means out of such path, and means for automatically returning the selector moving means to normal position.

39. In an apparatus for sorting record-cards, in combination, feeding-mechanism for the cards, a traveling carrier for the cards, selectors movable with and relatively to said carrier, means in the path of said selectors for effecting such relative movement, means controlled by the record card for moving said last mentioned means out of such path, and means movable with the carrier for returning the selector-moving means to normal position.

40. In an apparatus for sorting record-cards, the combination with card-feeding means, of a plurality of sorting stations, a card conveyer, selectors movable in synchronism or timed relation with the conveyer, and an electro-magnet common to all the selectors for determining which station shall receive the card.

41. In an apparatus for sorting record-cards, the combination with card-feeding means, of a plurality of sorting stations, a card conveyer, selectors movable in synchronism or timed relation with the conveyer, and card controlled means common to all the selectors for determining which station shall receive the card.

42. In an apparatus for sorting record-cards, the combination with card-feeding means, of a plurality of sorting stations, a card conveyer, selectors carried by said conveyer, and card controlled means common to all the selectors for determining which station shall receive the card.

43. In an apparatus for sorting record-cards, the combination with card-feeding means, of a plurality of sorting stations, a card conveyer, selectors carried by said conveyer, and means comprising an electro-magnet common to all the selectors for determining which station shall receive the card.

44. In an apparatus for sorting record-cards having index-points, the combination with card-feeding means, of a plurality of sorting stations, a card conveyer, selectors automatically positioned to correspond to the index-points on the cards, and an electro-magnet common to all the selectors for determining which station shall receive the card.

45. In an apparatus for sorting record-cards, the combination with card-feeding means, of a plurality of sorting stations, a card conveyer, selectors movable with said conveyer, means for positioning said selectors, and an electro-magnet for controlling the last mentioned means for determining which station shall receive the card.

46. In an apparatus for sorting record-cards, the combination with card-feeding means, of a plurality of sorting stations, a card conveyer, a series of selectors movable in synchronism with the conveyer, an electro-magnet common to all the selectors for determining which station shall receive the card, an electric circuit including said magnet, and record-controlled contacts in said circuit for energizing said magnet.

47. In an apparatus for sorting record-cards, the combination with card-feeding means, of a plurality of sorting stations, a card conveyer, a series of selectors, card controlled means for automatically positioning said selectors, card-discharging means controlled by the selectors, and means for returning the selectors to their normal positions after the cards have been discharged from the conveyer.

48. In an apparatus for sorting record-cards having index-point positions thereon, in combination, a traveling conveyer, means for feeding record-cards to said conveyer, sorting stations for said cards, means for disengaging the cards from the conveyer and discharging them into the sorting stations, selectors on said conveyer for controlling the disengaging means in accordance with their positions on said conveyer, and an electro-magnet common to all of said selectors for positioning them in accordance with the index-points on said cards.

49. In an apparatus for sorting record-cards having index-point positions thereon, in combination, a traveling conveyer, means for feeding record-cards to said conveyer, sorting stations for said cards, means for disengaging the cards from the conveyer and discharging them into the sorting stations, selectors on said conveyer for controlling the disengaging means in accordance with their positions on said conveyer, an electro-magnet common to all of said selectors for positioning them in accordance with the index-points on said cards, and means for returning said selectors to normal position.

50. In an apparatus for sorting record-cards having index-points thereon, feeding mechanism comprising card-controlled contacts, a traveling carrier to which the cards are delivered from the feeding mechanism, selectors on said traveling carrier, and an electro-magnet common to all of said selectors and controlled by the aforesaid contacts for positioning the selectors in accordance with the location of the index-points on said cards.

51. In an apparatus for sorting record cards having index-point positions thereon, feeding mechanism, a card-controlled electric circuit comprising contacts which are separated by the passage of the cards but closed when the index-points on said cards pass said contacts, a traveling carrier to which the cards are delivered from the feeding mechanism and from which the cards are delivered at their destinations, selectors on said carrier, and means for positioning the said selectors in accordance with the the index-points on said cards.

52. In an apparatus for sorting record-cards having index-point positions thereon, feeding mechanism, a card-controlled electric circuit comprising contacts which are separated by the passage of the cards but closed when the index-points on said cards pass said contacts, a traveling carrier to which the cards are delivered from the feeding mechanism and from which the cards are delivered at their destinations, selectors on said carrier, means for positioning said selectors in accordance with the index-points on said cards, and an electro-magnet in said circuit for controlling the last mentioned means.

53. In an apparatus for sorting record-cards having index-point positions thereon, a plurality of sorting stations corresponding to the index-point positions on the cards, means for delivering the cards to the sorting stations, and means actuated through the instrumentality of the cards for automatically stopping the apparatus after the accumulation of a predetermined number of cards in any one of the sorting stations.

54. In an apparatus for sorting record-cards having index-point positions thereon, a motor circuit including a motor, a plurality of sorting stations corresponding to the index-point positions on the cards, means for delivering the cards to the sorting stations, a relay magnet in said circuit, and an electric contact also in said circuit adapted to be broken by the filling of any one of said sorting stations for automatically stopping the motor.

In testimony whereof I affix my signature in the presence of two subscribing witnesses.

HERMAN HOLLERITH.

Witnesses:
JOSIAH C. STODDARD,
F. R. BELL.